Figure 1:
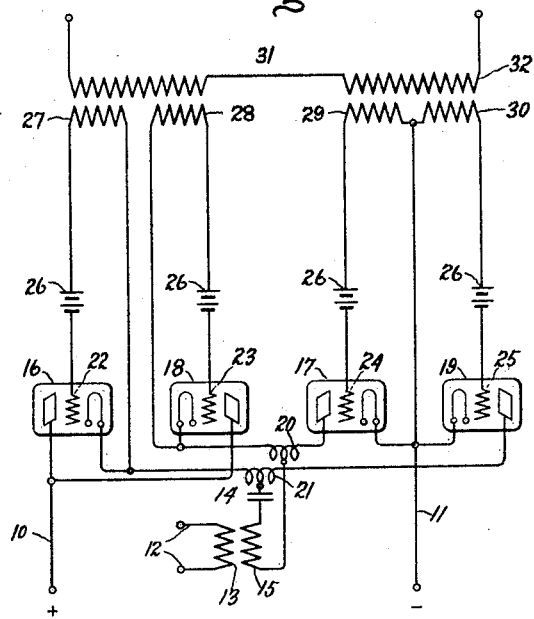

March 21, 1933.  A. S. FITZ GERALD  1,902,495

ELECTRIC POWER CONVERTING APPARATUS

Filed Aug. 8, 1930

Inventor:
Alan S. Fitz Gerald,
by Charles E. Tullar
His Attorney.

Patented Mar. 21, 1933

1,902,495

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC POWER CONVERTING APPARATUS

Application filed August 8, 1930. Serial No. 473,913.

My invention relates to electric power converting apparatus and more particularly to converting apparatus for transmitting power from a direct current source of supply to an alternating current system.

The present invention constitutes an improvement on that forming the subject matter of United States Letters Patent No. 1,752,-247, granted March 25, 1930, upon my application and assigned to the same assignee as the present application. In this earlier patent I have disclosed a simple and economical power converting apparatus in which a capacitor is connected in series with the load circuit and the charging and discharging currents of the capacitor are transmitted through different electrical discharge valves to the alternating current system. The apparatus described in that patent, however, has the disadvantage that power is drawn from the direct current supply only during alternate half-cycles of the power output, with the result that the direct current system is not operated at its maximum capacity.

It is an object of my invention to provide improved electric power converting apparatus which will effectively provide for the transfer of a maximum amount of energy between a direct current circuit and an alternating current circuit.

According to my present invention, I overcome the disadvantage of my prior arrangement by providing a double-acting circuit including four electric discharge valves. In this arrangement the capacitor is successively charged to opposite polarities so that power is drawn continuously from the direct current supply during each of the charging cycles.

My invention will be better understood from the following description taken in connection with the accompanying drawing and its scope will be pointed out in the appended claims.

In the accompanying drawing I have diagrammatically illustrated my invention as applied to a synchronously driven inverter.

Referring to the drawing I have shown a source of direct current supply comprising the leads 10 and 11 interconnected with an alternating current system 12, through two parallel circuits. The first of these circuits includes an electric discharge device 16, a capacitor 14, the primary winding 15 of a transformer 13 and an electric discharge device 17. The other parallel circuit includes an electric discharge device 18, the primary winding 15 of the transformer 13, the capacitor 14, and an electric discharge device 19. Each of the electric discharge devices 16 to 19 includes the usual cathode and anode and controlling grids 22 to 25 inclusive. These grids are connected to their respective cathodes through biasing batteries 26 and the secondary windings 27 to 30, respectively, of a transformer 31. The primary winding 32 of transformer 31 is supplied with alternating current of a frequency the same as that desired on the alternating current system 12. A reactor 20 may be inserted between the discharge devices 17 and 18 and a similar reactor 21 may be inserted between the discharge devices 16 and 19 for the purposes hereinafter set forth. The circuit including the capacitor 14 and the primary winding 15 of the transformer 13 is connected between the midpoints of these reactors.

The electric discharge devices 16 to 19 may be of any of the types well known in the art, such for example, as the vapor electric type in which the current between the cathode and anode may be prevented from starting by impressing the proper potential upon the controlling grid, and in which the device is made conducting by impressing a more positive potential upon the grid, or the pure electron thermionic emission type in which the current between the cathode and anode is continuously controlled by the grid potential.

Assuming that a direct current potential is impressed across the leads 10 and 11 and the potential derived from the secondary winding 27 is of such magnitude and of the right polarity to overcome the grid bias of the battery 26 so that the discharge device 16 is made conducting, the same potential will simultaneously be impressed upon the grid of the discharge device 17 and a current will flow through the discharge device 16, capacitor 14, winding 15, and the discharge device 17 to the direct current lead 11, until the capacitor 14 is completely charged, or until the discharge devices 16 and 17 are made non-conducting in case the pure electron discharge type is employed. Immediately thereafter the polarity of the grid potentials is reversed, the discharge devices 16 and 17 made non-conducting and the discharge devices 18 and 19 made conducting. In this condition, the potential across the capacitor 14 is cumulative with that of the direct current supply and a current will flow from conductor 10 through discharge device 18, winding 15, capacitor 14 and discharge device 19 to the other side of the line, until the capacitor 14 is completely charged to the opposite polarity or until the devices 18 and 19 are made non-conducting. It is obvious that this cycle will be repeated at a frequency depending upon the alternating current potential supplied to the transformer 31. In the successive changes in the current flow between the two parallel paths it is noted that the current flows in opposite directions through the winding 15 with the result that an alternating current is supplied to the lines 12.

In the above description it has been assumed that the discharge devices 16 to 19 were of the pure electron discharge type in which the current flow is under the complete control of the grids. If these devices are of the vapor discharge type in which the grids control only the starting of the current through the device, it is necessary to include either the reactor 20 or 21 or preferably both. In case the devices 18 and 19 should be made conducting before the current has been interrupted in the parallel circuit, which is the case when the driving frequency of the transformer 32 is above the natural frequency of the system, there would be a virtual short circuit across the lines 10 and 11. By providing the reactors 20 and 21, however, as soon as the current begins to flow through the discharge devices 18 and 19, through the right hand portion of the reactor 20, and the left hand portion of the reactor 21, a countervoltage is induced in the other portions of these reactors which is in opposition to the voltage between the anodes and cathodes of the discharge devices 16 and 17 and greater in magnitude, with the result that the current in these devices is quickly interrupted.

While I have shown and described what I at present consider the preferred embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In a system for converting direct current electrical energy into periodically varying current, the combination of a source of direct current, a plurality of electrical valves, a capacitor, a circuit including a plurality of said valves for charging said capacitor from the full voltage of said source, a circuit including a plurality of other of said valves for oppositely charging said capacitor from the full voltage of said source, means for controlling the conductivities of said valves, and an output circuit common to both of said charging circuits and adapted to furnish periodically varying currents.

2. In a system for converting direct current electrical energy into periodically varying current, the combination of a source of direct current, a plurality of electrical valves, a capacitor, a circuit including a pair of said valves for charging said capacitor from the full voltage of said source, a circuit including another pair of said valves for oppositely charging said capacitor from the full voltage of said source, an output circuit common to both of said charging circuits and adapted to furnish periodically varying currents, and means for successively changing the conductivities of said pairs of valves.

3. The combination of a source of direct current, a plurality of vapor electric discharge devices, each provided with a grid for controlling the starting of current between its cathode and anode, a capacitor, a circuit including a pair of said discharge devices for charging said capacitor from the full voltage of said source, a circuit including another pair of said discharge devices for oppositely charging said capacitor from the full voltage of said source, an alternating current circuit common to both of said charging circuits, and means for controlling the potentials of said grids.

4. The combination of a source of direct current, a plurality of vapor electric discharge devices each provided with a grid for controlling the starting of current between its cathode and anode, a capacitor, a circuit including a pair of said discharge devices for charging said capacitor from the full voltage of said source, a circuit including another pair of said discharge devices for oppositely charging said capacitor from the full voltage of said source, an alternating current circuit common to both of said charging circuits, and means for applying alternating potentials of opposed polarities to the grids of said pairs of discharge devices.

5. In a system for converting direct current electrical energy into alternating current, the combination of a source of direct current, a plurality of electric valves, a capacitor, a circuit including a pair of said valves and said capacitor connected serially across said source, a second circuit including another pair of said valves and said capacitor connected serially and in parallel to said first circuit, means for controlling the conductivities of said valves, and an alternating current output circuit common to both of said first mentioned circuits.

6. In a system for converting direct current electrical energy into alternating current, the combination of a source of direct current, a plurality of electric valves, a capacitor, two parallel circuits connected across said source, each circuit including a different pair of said valves, said capacitor being connected between the valves of both circuits, means for successively and alternately rendering the pairs of valves conducting and non-conducting, and an alternating current output circuit common to both of said first-mentioned circuits.

In witness whereof, I have hereunto set my hand this 6th day of August, 1930.

ALAN S. FITZ GERALD.